United States Patent [19]

Jeavons

[11] Patent Number: 5,434,468
[45] Date of Patent: Jul. 18, 1995

[54] RADIOGRAPHIC DETECTOR WITH PERFORATED CATHODE

[75] Inventor: Alan P. Jeavons, Oxford, England

[73] Assignee: Oxford Positron Systems Limited, Kidlington, England

[21] Appl. No.: 104,805

[22] Filed: Aug. 10, 1993

Related U.S. Application Data

[60] Continuation of Ser. No. 851,616, Mar. 16, 1992, abandoned, which is a division of Ser. No. 634,116, Dec. 28, 1990, Pat. No. 5,138,168.

[51] Int. Cl.6 ............................................. H01J 61/30
[52] U.S. Cl. ............................... 313/346 R; 313/491; 313/632
[58] Field of Search ............... 313/346, 491, 632, 631, 313/93; 250/385.1, 374

[56] References Cited

U.S. PATENT DOCUMENTS 3,693,046  9/1972  Glaser ................................. 313/353
4,112,329  9/1978  Veith ................................ 313/493 X

FOREIGN PATENT DOCUMENTS 0225627   4/1988  European Pat. Off. .
1458909  12/1976  United Kingdom .
WO8603332 6/1986  WIPO .

OTHER PUBLICATIONS

Webster's Ninth New Collegiate Dictionary ©1990 p. 216.

Primary Examiner—Sandra L. O'Shea
Assistant Examiner—Vip Patel
Attorney, Agent, or Firm—Barnes, Kisselle, Raisch, Choate, Whittemore & Hulbert

[57] ABSTRACT

Apparatus and method for quantitative autoradiography analysis involving beta-ray radiation comprises a converter 2 and wire chamber 3 in association with a membrane which provides a seal for the housing in which the converter and wire chamber are accommodated, the membrane also providing a "window" for the radioactive samples.

6 Claims, 7 Drawing Sheets

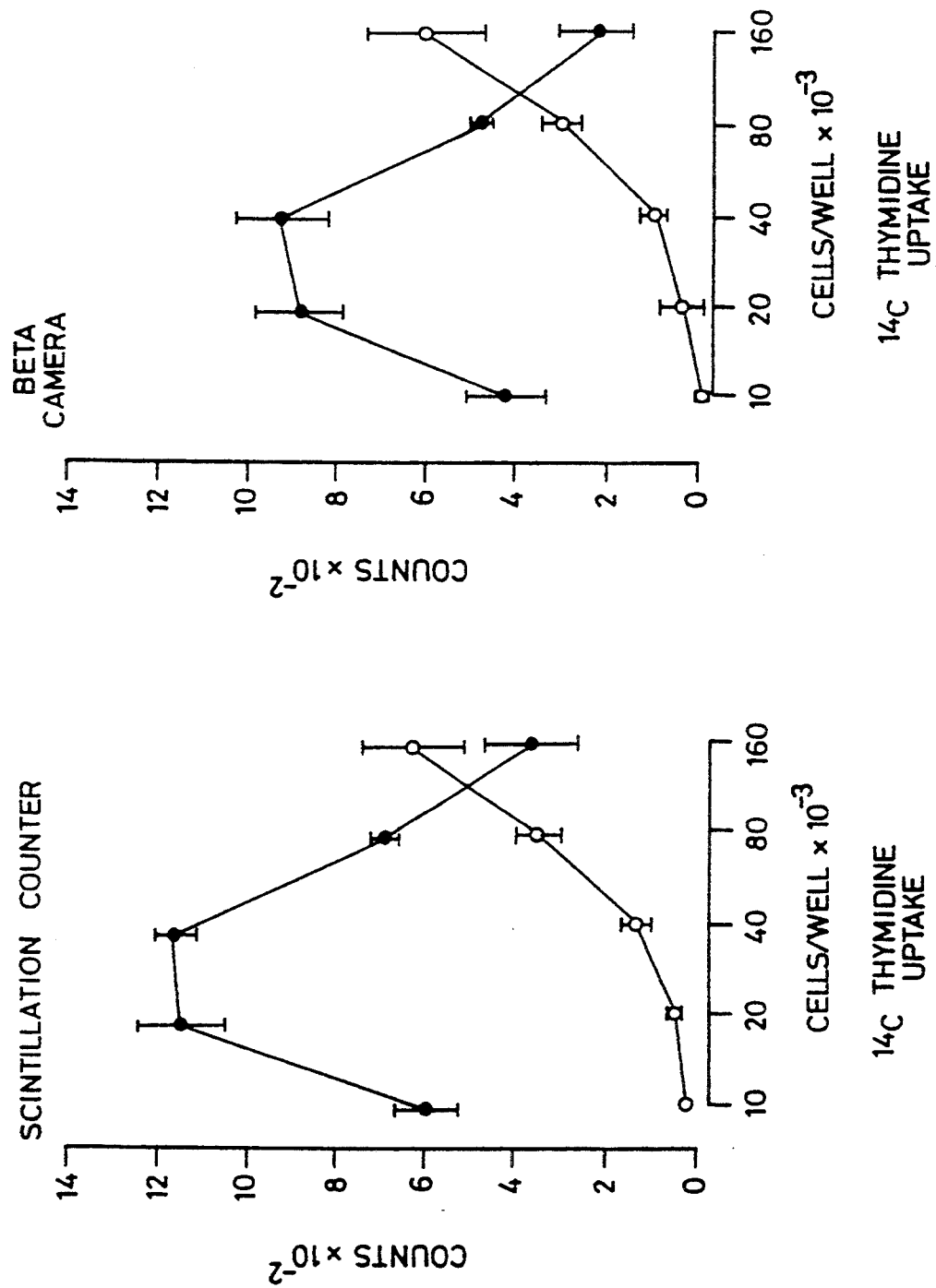

005,434,468

RADIOGRAPHIC DETECTOR WITH PERFORATED CATHODE

This application is a continuation of application Ser. No. 07/851,616 filed Mar. 16, 1992, now abandoned, which is a division of application Ser. No. 07/634,116 filed Dec. 28, 1990, now U.S. Pat. No. 5,138,168.

This invention relates to a method and apparatus for quantitative autoradiography analysis using electron or beta radiation from radionuclides.

BACKGROUND OF THE INVENTION

A microassay technique for measuring immunological activity has been developed based on the incorporation of radioactive nucleotides into lymphocyte DNA. This allows study of multiple samples of cells taken from patients with a variety of diseases, or from experimental animals. It is not uncommon for several hundred samples per day to require assay of radioactive incorporation into samples which are harvested onto filter discs, often referred to as "dot-blots". The major limitations in the application of this technique result from the requirement to cut individual dot-blots from a multi-sample filter, transfer them to vials, add the hazardous, solvent-based, scintillant counting-fluid to each vial, cap, number and finally effect a radiation count of the individual samples using a scintillation counter. Thus this technique is extremely time consuming and involves the use of hazardous material.

An alternative method involves the use of photographic film for mapping. The principal advantages of this method, namely that photographic film is inexpensive and the spatial resolution obtained is excellent, are outweighed by the disadvantages which are that the technique is relatively insensitive because exposure times are measured in days, only limited quantitation can be obtained and even that involves the use of expensive instruments, and the technique is extremely time consuming.

Thus there is a long-felt need for a method and apparatus for the simultaneous counting of multiple samples on single filters by direct counting of radioactive emissions, so avoiding the shortcomings of the multiple sample handling and the use of the scintillation counting technique, and the photographic technique. Accordingly, this is the objective of the present invention.

SUMMARY OF THE INVENTION

The present invention is based on a high-density avalanche chamber (referred to as hereinafter as HIDAC) detector first developed for the imaging of positron-emitting radioisotopes. This type of detector has been further developed over the years and one particular development is disclosed in a paper entitled "The High-Density Avalanche Chamber for Position Emission Tomograph" written jointly by the present inventor, A. P. Jeavons, and others and presented at the IEEE Nuclear Science Symposium, Washington D.C., United States of America, 20–22 Oct. 1982. The disclosure of this paper is incorporated herein by reference.

The HIDAC detector has been used very successfully in hospitals for the scanning of patients and has to date used X-ray or gamma-ray converters. The HIDAC detector comprises a plurality of converters each comprising a stack of alternate conductive and non-conductive layers, typically of lead and fibreglass, respectively. The converters are "transparent" to the incident radiation by way of being perforated. More specifically, the converters are formed with 1 mm diameter holes arranged in a triangular pattern with centre-to-centre distance of 1.16 mm. The converters may be arranged in pairs to increase sensitivity and each pair has a multi-wire chamber on each side thereof, making four multi-wire chambers in all. Each multi-wire chamber comprises a multi-wire anode inbetween a pair of multi-wire cathodes, with the wires thereof having a 1 mm pitch and with the wires of adjacent pairs of anodes and cathodes being orthogonally arranged to provide X and Y axis detection. The converters and multi-wire chambers are disposed in a gas-tight container through which a gas, for example a mixture of Ne—$CO_2$, is passed at a pressure slightly above atmospheric pressure. A strong electric field, for example 12 kV/cm, is applied across the converter.

The use of lead in the converters is dictated by the inability of gamma radiation of itself to ionise a gas. Thus the lead is used to arrest incident photons which thus release photoelectrons from the lead which then ionise the gas. The electrons are contained within a given hole in a converter, whereby electron range is minimised. The strong electric field extracts the gas ionisation products created by the photoelectron. Electron avalanching occurs in the strong electric field within the holes and, after extraction, the electrons are detected by the anode wires with good spatial resolution. Each electron produces a pulse in the nearest anode wire and the position of the avalanche is determined by reading the signals induced by the anode pulse in the orthogonally arranged wires of the two associated cathodes.

According to a first aspect of the present invention, there is provided apparatus for quantitative autoradiography analysis of a plurality of samples using beta-rays and comprising an open-ended housing, chamber means mounted in the housing, electrode assembly means comprising cathode means and anode means disposed at one side of the chamber means, and a membrane disposed at the other side of the chamber means and operable to seal the open end of the housing to make the latter gas tight, in use the housing being filled with gas, and to allow the through passage of beta-rays from beta-ray-radiating samples in use placed on the membrane, characterised in that the chamber means comprises at least one perforated member comprising continuous and alternate conductive and non-conductive layers, and in that the electrode means comprises at least one electrode assembly comprising a first cathode which is perforated and disposed adjacent one side of the converter, a multi-wire anode disposed adjacent the first cathode, and a second cathode disposed adjacent the anode.

In as much as beta-rays ionise gas directly, then the use of the known gamma-ray converter was not an obvious expedient but has been found to provide excellent results of the same, if not better, accuracy as those obtained from the scintillation method but obtained in a matter of minutes, for example 30 minutes. Thus the invention affords a dramatic saving in time.

The perforated cathode may be spaced from the perforated member or may be part of the latter so as to be integral therewith. This saves on drilling operation in as much as said member and cathode can be drilled at the same time to produce the perforation and furthermore, the relatively thin cathode is maintained substantially planar (to within 0.1 mm) by the more rigid perforated member which assists greatly in stabilising the operation of the multi-wire chamber.

To date, the multi-wire electrodes have been manufactured by hand which is time-consuming and expensive, gives rise to a relatively high scrap rate, and a finished electrode is extremely delicate and has to be handled with great care as the tracks formed by the wires must be maintained mutually parallel.

According to a second aspect of the present invention there is provided a perforated cathode comprising a printed circuit board comprising a base of an electrically non-conductive material on one face of which base a plurality of parallel, electrically-conductive tracks are provided, the tracks being spaced apart by a predetermined distance, and a series of through apertures provided between each adjacent pair of tracks.

Preferably, the through apertures have a dimension greater than said predetermined distance by which the tracks are separated, whereby some track material is removed, leaving each track with non-parallel sides.

The opposite face of the non-conductive base may be provided with a layer of an electrically conductive material to provide an electrical screen, the apertures extending through the screen.

A cathode in accordance with the second aspect of the present invention may be used with the apparatus constructed in accordance with the first aspect of the invention.

BRIEF DESCRIPTION OF THE DRAWINGS

Apparatus for quantitative auto-radiography analysis in accordance with the present invention will now be described in greater detail, by way of example with reference to the accompanying drawings, in which :

FIGS. 9A and 9B are graphs useful in explaining the operation of the various embodiments.

Figure 1:
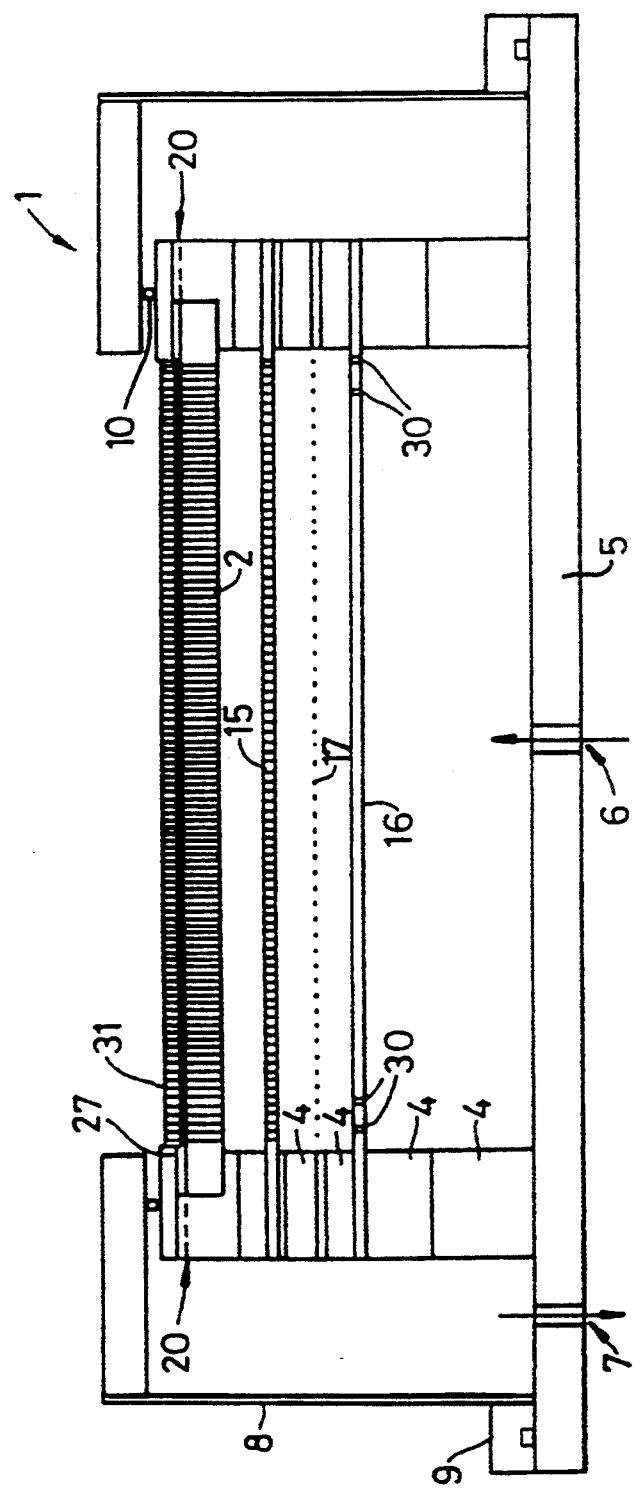
FIG. 1 is a diagrammatic cross-sectional view of a first embodiment.

The apparatus comprises essentially a basically open-ended housing 1 in which are mounted a perforated member 2, and a multi-wire chamber 3. The housing 1 is rectangular and formed from a plurality of solid spacers 4 of different thicknesses so as to space the converter 2 from the wire chamber 3, and the components of the wire chamber relative to each other, as required. One end of the housing 1 is closed by a baseplate 5 of larger surface area than that of the end of the housing which it closes, and having a gas inlet 6 and a gas outlet 7. An aperture lid 8 is provided for the housing, the lid having a bottom peripheral flange 9 fitted with an O-ring seal cooperable with the baseplate 5 to seal the lower end of the housing. A compression seal 10 is provided between the underside of the lid 8 and the top of the uppermost spacer 4 to seal the top of the housing 1 as between the lid and spacers. The otherwise open end of the housing is sealed by a membrane 27 to be described further hereinafter. The uppermost spacer 4 is provided with gas bleed slots 20 to allow the gas to flow from the inlet 6 to the outlet 7.

Figure 2:
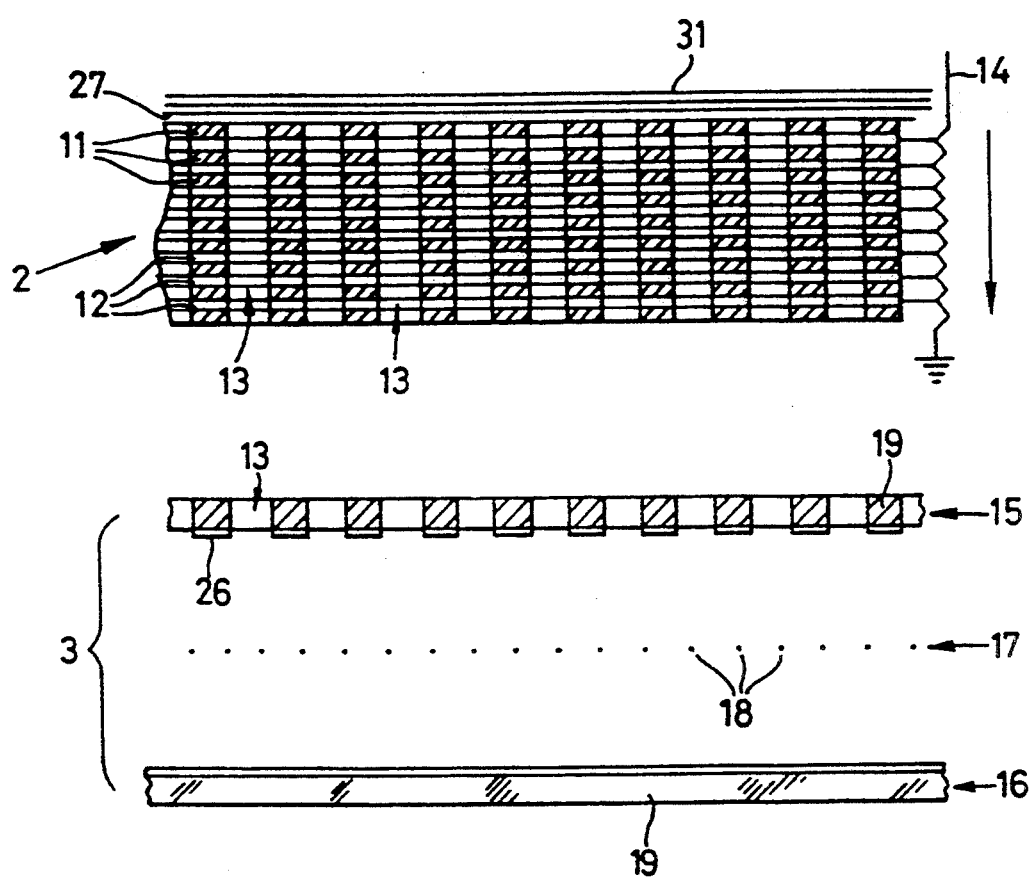
FIG. 2 is a detail of FIG. 1 to an enlarged scale.

The perforated member 2 is of conventional construction as described, for example, in the above-referenced Paper by A. P. Jeavons et al. Briefly, the perforated member 2 comprises contiguous alternate layers of a non-conductive material 11, such as fibreglass, and layers of lead 12. The layers 11,12 are adhered together to form a composite stack 13 and the stack formed with rows and columns of apertures so as to make the stack perforate and hence "transparent" to incident beta radiation. FIG. 2 shows the stack 13 in enlarged detail, together with the multi-wire chamber 3. The layers of lead 12 have a negative high tension electrical supply connected thereto as indicated at 14.

The multi-wire chamber 3 comprises a perforated first cathode 15 disposed next to the underside of the perforated member 2, a second but non-perforated cathode 16, and a wire anode 17 disposed between the two cathodes. The first cathode 15 needs to be transparent to the gas ionisation generated by the incident beta-ray radiation in the converter apertures, and the anode 17 needs to be able to receive the gas ionisation. To this end, the anode 17 is formed from a plurality of parallel wires 18 stretched across, and anchored to, a frame (not shown). However, the cathodes 15 and 16 are different according to one aspect of the present invention although to date, they have been of the same wire construction as the anode 17 in the known HIDAC detectors.

Figure 4:
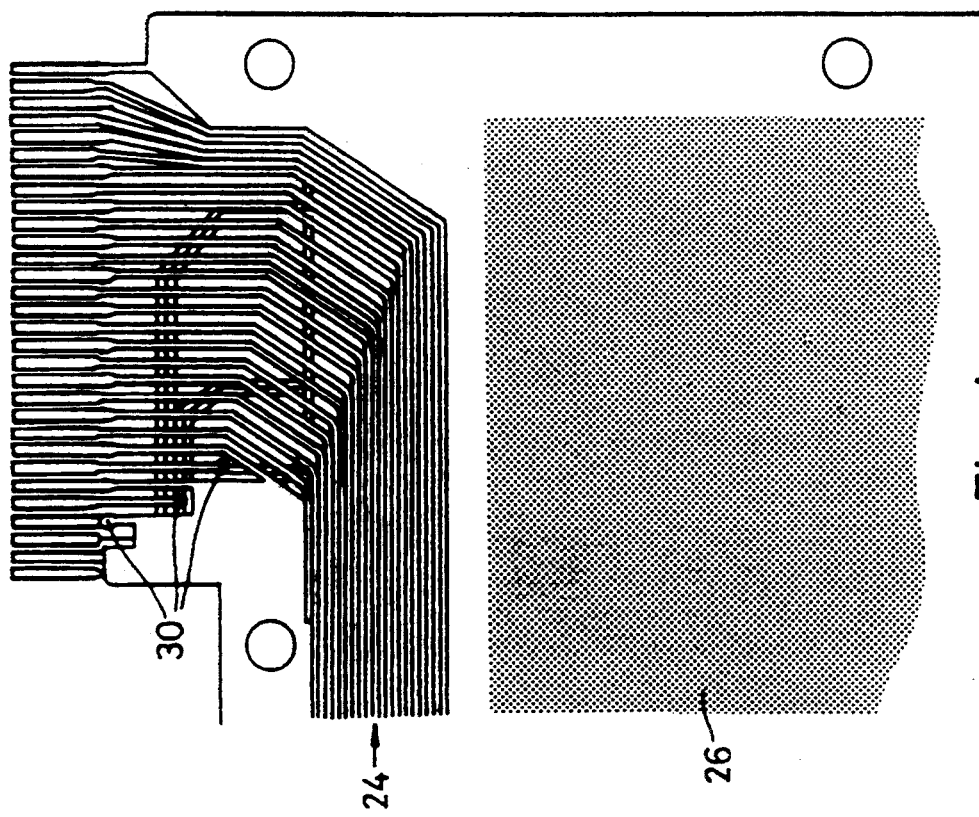
FIGS. 3 and 4 are fragmentary top and underside views of a component of the embodiment of FIG. 1.
Figure 3:
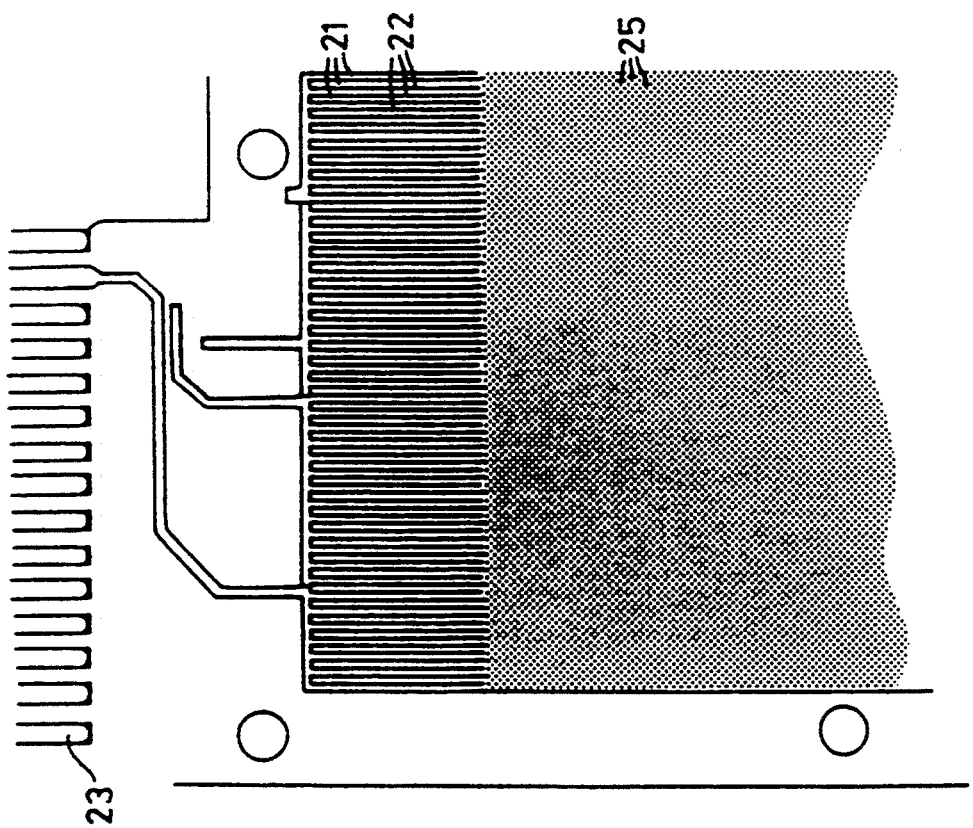

Basically, the cathodes 15 and 16 are in the form of printed circuit boards each having a base 19 of fibreglass, as is conventional, on one side of which is provided a conductive material such as copper which is etched so as to form a plurality of conductive tracks 21 (FIG. 3) which are spaced apart by a predetermined distance and thus insulated from one another by the intervening fibreglass tracks or strips 22. The tracks 21 are connected to edge terminal strips 23 in a known manner with bussing strips being formed on the opposite face of the base 19 as indicated at 24 in FIG. 4, plated through holes 30 connecting the bussing strips 23 to the other side of the cathode and also serving, in the second cathode 16, as passages for the incoming gas.

Figure 5:
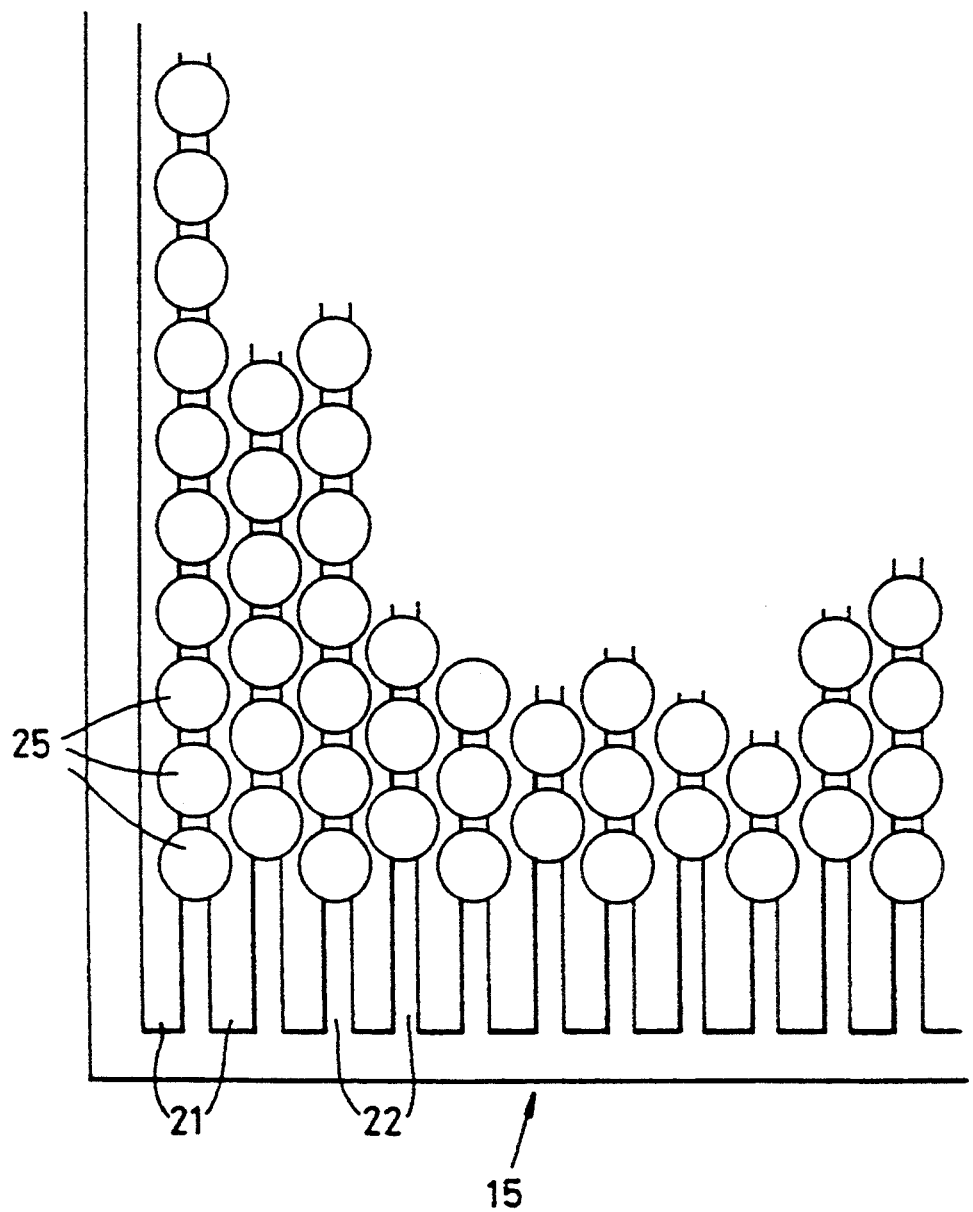
FIG. 5 is an enlarged detail of FIG. 3, FIGS. 6 and 7 are similar to FIGS. 1 and 2, respectively, but illustrate a second embodiment.

The second cathode 16 does not in fact need to be transparent to the incident beta radiation and so can be used without further processing, the tracks 21 serving as the previously used wires. However, the first cathode 15 does need to be transparent to the gas ionisation and the latter has to pass therethrough to the anode 17, as discussed above. Accordingly, the first cathode 15 is further processed by forming a series of circular through holes 25 along each insulating track 22 between adjacent conductive tracks 21, and along the outside edges of the two outer tracks 21. The diameter of the holes 25 is made greater (typically 1 mm) than the separation distance between the conductive tracks 21 (typically 0.3 mm). The apertures in adjacent non-conductive tracks 22 are offset from one another. Thus a given hole 25 breaks into each of the associated pair of conductive tracks 21, as shown more clearly in FIG. 5, with the result that each conductive track takes a generally sinusoidal shape with flattened peaks and the offset hole arrangement makes the tracks of an adjacent pair the mirror image of one another.

The opposite face of at least the first cathode 15 is provided with a layer of conductive material, typically copper, to form an electrical screen 26, the screen being perforated by the through holes 25. Thus the two cathodes 15 and 16 are of very rigid construction and are readily handled without fear of damaging the tracks 21, unlike the previous wire constructions such as that of the anode 17. The tracks 21 of the two cathodes 15 and 16 are arranged at right angles to one another so as to provide X and Y axis detection.

Returning to FIG. 2 of the drawings, the open side of the housing 1 is sealed as already mentioned, with the membrane 27 to make the housing gas tight. The membrane may be constructed from the synthetic plastics material known under the trade mark MYLAR and which is metallised on both sides. The thickness of the membrane may be of the order of a few microns which is sufficient to effect the required sealing of the housing 1 and yet thin enough to allow the through passage of beta radiation. However, with such a thin membrane 27, there is a danger of it being ruptured by the internal pressure in the housing 1 but rather than increase the thickness of the membrane itself with the attendant reduction in sensitivity of the apparatus, it is preferred to provide a membrane support 31 which sits on the membrane 27 and which is apertured in the same manner as the perforated member 2, with the apertures in these two components being aligned. Thus the support 31 prevents rupture of the membrane 27 but does not detract from the passage of the beta radiation from the samples under test to the perforated member 2. The support 31 would be located such that any cover, when provided, sits thereon. The support 31 may be of the order of 0.1 mm thick.

A cover (hinged or otherwise) may be provided at the otherwise open end of the housing 1 in order to retain samples in close contact with the membrane 27 and to prevent access to the apparatus when the high tension is applied to the perforated member 2, suitable interlocks being provided to this end. Such a cover is not shown.

In use of the apparatus, an inert gas such as argon or Ne—$CO_2$, for example, is fed to the housing through the inlet and flows therethrough for the duration of an analysis. Beta radiation-emitting samples are placed on the membrane 27, the cover (if provided) placed in position and the negative high tension applied to the perforated member 2 and a further positive high tension to the anode 17. The beta radiation enters the apertures in the perforated member 2 and ionises the gas therein directly so that the perforated member 2 does not in fact operate in precisely the same way as it needs to in the HIDAC detector involving gamma-rays. The applied electric field, which may be of the order of 12 kV/cm, amplifies and extracts the gas ionisation which passes through an adjacent hole 25 in the first cathode 15 and produces electrical current pulses in the anode 17 which generate corresponding pulses in the cathodes 15 and 16 which are detected and counted using data acquisition apparatus which may be a relatively simple computer (not shown) such as Sinclair QL computer because data rates are not high—of the order of 1000 events a second. The detection and recording of each event in the wire chamber 3 is that used with the known HIDAC detector. The trapping of the beta radiation in the perforated member 2 means that gas ionisation is not spread over several millimeters which is a fundamental limitation of spatial resolution in the conventional wire chamber when used alone, bearing in mind that if the beta radiation is allowed to spread it will ionise the gas in all areas which it penetrates, thus substantially degrading spatial resolution.

Figure 6:
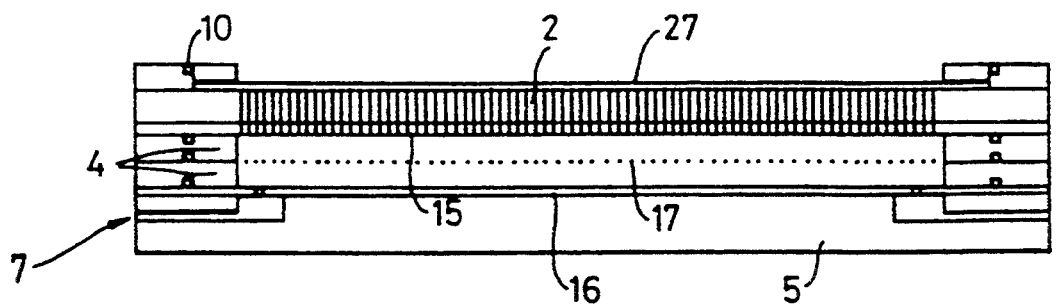
Figure 7:
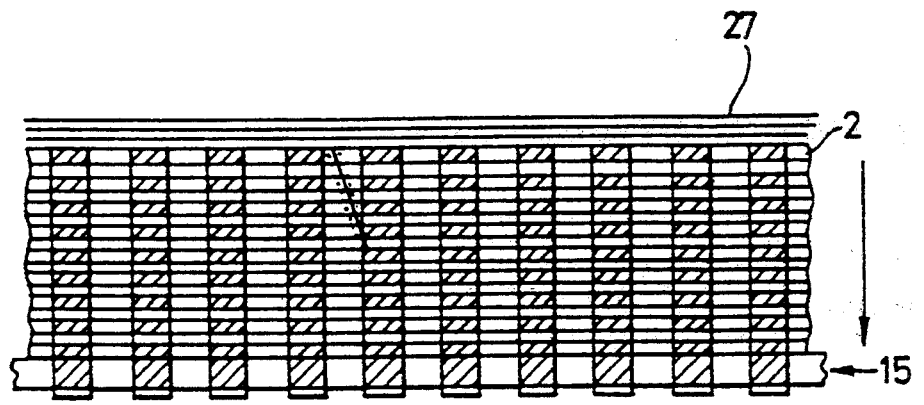
Figure 7:
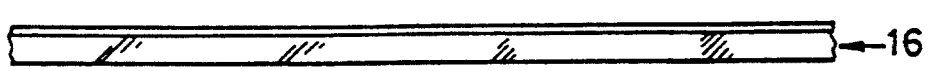

Referring now to FIGS. 6 and 7 of the drawings, these illustrate an alternative embodiment in which the perforated cathode 15 is bonded to the perforated member 2 and is thus integral therewith. This combined arrangement of cathode and converter is preferred and is very convenient to produce as it saves one drilling operation in that the converter and cathode can be cathode drilled together rather than separately as is necessary in the embodiment of FIG. 1. The form of the cathode 15 remains unchanged although there are some different features of construction such as the positioning of the seal 10 and the gas inlet 6 and outlet 7.

It should be noted that the chamber 3 involves two stages of electron amplification; one in the perforated member 2 and another in the wire chamber itself. Previously, all devices of this nature have incorporated a gap between the two stages where a low electrical field is applied to render the gap non-amplifying. This has been done to prevent feedback from one stage to another which can cause sparking and electrical breakdown. However, contrary to expectation, it has been found that removal of the gap by combining the perforated cathode with the converter causes no problems and provides reliable, high-gain operation.

Figure 8:
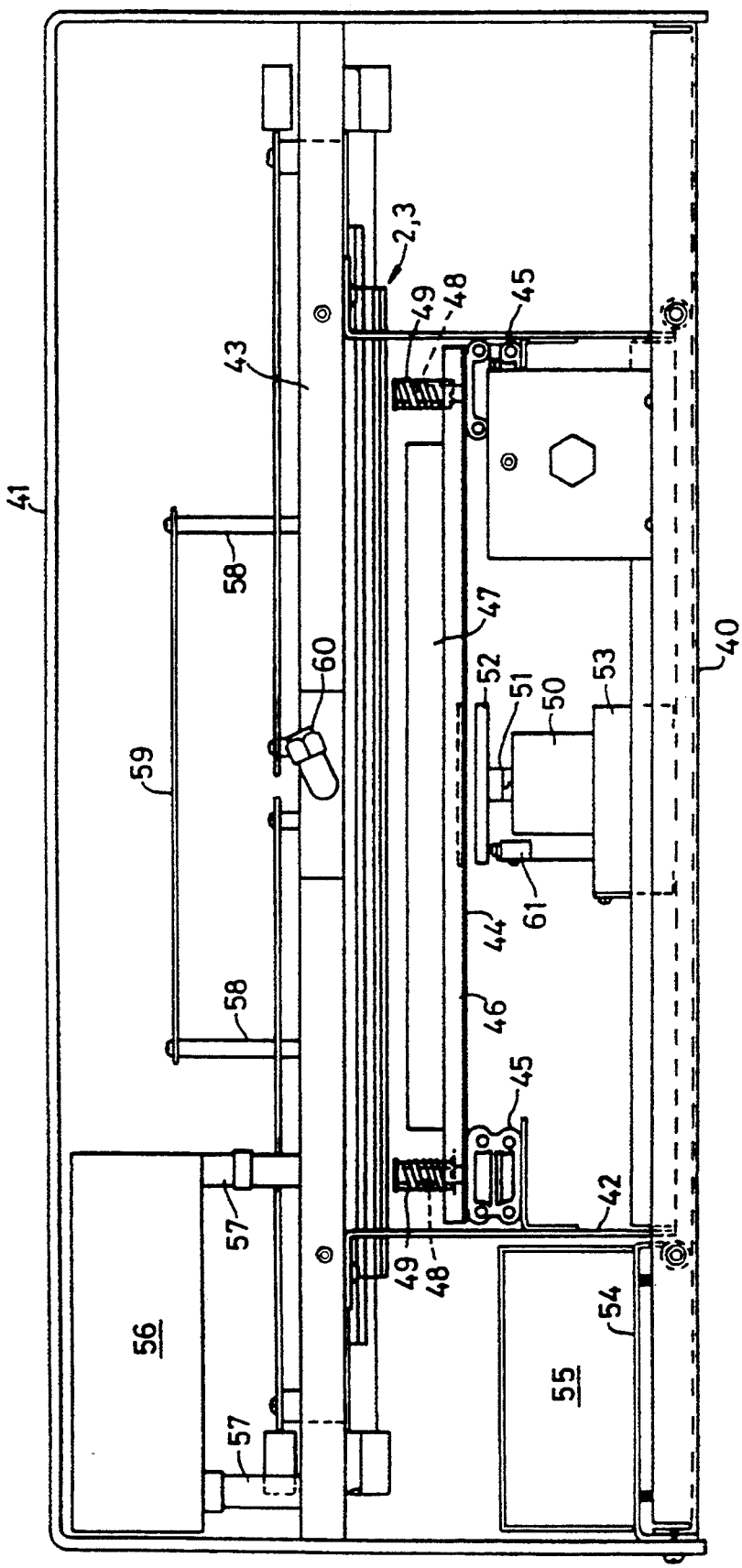
FIG. 8 is a rear view of a third embodiment.

With reference now to FIG. 8 of the drawings, this illustrates a third embodiment which differs from the embodiments of FIGS. 1–5 and 6,7 in that the perforated member 2 and multi-wire chamber 3 are mounted in an overall casing. The perforated member 2 may have the cathode combined therewith in accordance with the embodiment of FIGS. 6 and 7 but a separate converter cathode arrangement of FIGS. 1–5 may be employed.

FIG. 8 is a view from the rear of the embodiment with a back panel removed and it will be seen that the casing comprises a base plate 40 to which is attached a cover 41 and front and rear panels (not shown). Mounted above the base 40 and supported from the latter by brackets 42 is a base plate 43 which supports the perforated member 2 and the multi-wire chamber 3 in an inverted position compared to that of the embodiments of FIGS. 1–5 and 6,7. A drawer 44 is provided below the perforated member 2 and is slidingly mounted on slides 45 and operable to receive a sample plate 46 containing beta radiation-emitting samples. A pressure pad 47 is provided on the drawer and the latter is also fitted with guide pins 48 on which are placed respective springs 49. The guide enables the drawer to be moved towards the perforated member 2 against the action of the springs 49, in use this movement being effected by a double-acting gas controlled cylinder 50 the piston 51 of which is fitted with a plate 52 which is engageable with the underside of the drawer 44 when the cylinder is extended. The cylinder 50 is controlled by a solenoid valve 53.

A sub chassis 54 provided on the base 40 accommodates a high voltage supply 55, and a low voltage power supply 56 is mounted on the base plate 43 via spacers 57. Further spacers 58 support a printed circuit board 59 providing the X,Y decoder for the apparatus. A gas inlet 60 is provided for the introduction of inert gas to the apparatus, as with the previous embodiments, this same gas also being used to actuate the cylinder 50.

In use of the apparatus of FIG. 8, the drawer 44 is pulled out and a sample plate 46 placed thereon and the drawer then returned. With the power supplies energised and the inert gas supplied to the apparatus, the cylinder 50 is then extended so as to press the sample plate 46 against the membrane 27 of the perforated member 2 and readings taken as described in connection with the earlier embodiments. The cylinder 50 is then retracted, a limit switch 61 serving to control the cylinder retraction so as to ensure that the plate 52 is clear of the underside of the drawer 54 in order to allow sliding movement thereof. The drawer 44 is then pulled out and the sample plate removed and a further plate inserted, as required.

It will be seen that the embodiment of FIG. 8 provides a more automated arrangement for sample analysis.

The apparatus of the illustrated embodiments has been used with $^{14}$C "dot-blots" of cell cultures (nitrogen-stimulated lymphocytes), the filter disc 29 being shown in FIG. 2 and very satisfactory results have been obtained in 30 to 40 minutes from a whole filter without any modifications to accommodate the special problems of low energy radioactive emission. These results are compared with the known scintillation technique discussed above in the graphs of FIGS. 9A and 9B, with the scintillation results given in the graph of FIG. 9A and of the beta radiation detector in accordance with the present invention in FIG. 9B. The upper lines in each graph are counts from the nitrogen-stimulated lymphocytes and the lower lines from control non-stimulated cells.

It will be appreciated that the apparatus can handle all types of beta-ray radiation such as $^{35}$S and $^{32}$P as well as $^{14}$C.

Thus it will be seen that the present invention affords a dramatic reduction in analysis time without loss of accuracy, compared with known techniques. Furthermore, since the apparatus only needs use one perforated member and one wire chamber, the cost is likely to be of the order of a third of the present scintillation technique.

The present invention has widespread applications in three biological fields:

1. electrophoresis gels
2. molecular hybridisation of RNA and DNA
3. cellular activation The present invention represents a significant advance in the art of quantitative autoradiography analysis and offers the following advantages :

1. Easy-to-use, laboratory bench instrument.
2. Large reduction in imaging time.
3. No separation of elements to be imaged is necessary.
4. Low-cost.
5. When the combined perforated member and cathode is used there is a further reduction in cost due to the reduction in drilling operation from two to one. Another advantage is that the otherwise relatively thin cathode is maintained substantially planar (to within 0.1 mm) by the rigid perforated member which aid stable operation of the multi-wire chamber.

I claim:

1. In a radiographic detector that includes a detector chamber with an anode, a cathode and means for admitting electrons of an ionized gas to the chamber for electrical detection between the anode and cathode by impingement of ionized gas particles on the anode and cathode, the improvement wherein said cathode and said electron-admitting means together include a perforated cathode comprising a printed circuit board having a base of an electrically non-conductive material, on one face of which base there are a plurality of parallel, electrically-conductive tracks (21), the tracks being spaced apart by a predetermined distance (22), and a series of through apertures (25) between each adjacent pair of tracks for admitting the electrons through said cathode into said chamber.

2. A detector according to claim 1, wherein the through apertures (25) have a dimension greater than said predetermined distance (22) by which the tracks (21) are separated, whereby said tracks have non-parallel sides.

3. A detector according to claim 1 and 2 wherein the apertures (25) are circular.

4. A detector according to claim 3 wherein non-conductive base has a face opposite said one face on which there is a layer of an electrically-conductive material to provide an electrical screen.

5. A detector according to claim 1, wherein said non-conductive base has a face opposite to said one face on which there are bussing strips connected to the respective tracks on said one face by plated through holes.

6. A detector according to claim 1, wherein said non-conductive base has a face opposite to said one face on which there is an electrical screen.

* * * * *